(12) United States Patent
Lee et al.

(10) Patent No.: US 9,621,370 B2
(45) Date of Patent: Apr. 11, 2017

(54) APPARATUS AND METHOD FOR PROVIDING INTERACTIVE SERVICE TO DEVICE USING DIFFERENT DIGITAL BROADCAST MIDDLEWARE STANDARDS

(75) Inventors: Ye-youl Lee, Seoul (KR); Si-cheol Kim, Seoul (KR); Yoo-seung Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 677 days.

(21) Appl. No.: 13/366,043

(22) Filed: Feb. 3, 2012

(65) Prior Publication Data

US 2012/0137339 A1 May 31, 2012

Related U.S. Application Data

(63) Continuation of application No. 11/855,538, filed on Sep. 14, 2007, now abandoned.

(30) Foreign Application Priority Data

Feb. 15, 2007 (KR) ........................ 10-2007-0016157

(51) Int. Cl.
*H04N 7/173* (2006.01)
*H04N 7/16* (2011.01)
(Continued)

(52) U.S. Cl.
CPC ......... *H04L 12/2814* (2013.01); *H04N 21/40* (2013.01); *H04N 21/418* (2013.01);
(Continued)

(58) Field of Classification Search
CPC .. H04N 21/40; H04N 21/418; H04N 21/4183; H04N 21/436; H04N 21/43607;
(Continued)

(56) References Cited

U.S. PATENT DOCUMENTS 6,539,433 B1 3/2003 Tominaga et al.
7,567,565 B2 7/2009 La Joie
(Continued)

FOREIGN PATENT DOCUMENTS

KR 20010028526 A 4/2001
KR 10-2005-0014618 A 2/2005
(Continued)

OTHER PUBLICATIONS

HANA Whitesheet downloaded from www.archive.org, the Feb. 20, 2006 entry of website www.hanaalliance.org, copyright 2006.*
(Continued)

*Primary Examiner* — Justin Shepard
(74) *Attorney, Agent, or Firm* — Sughrue Mion, PLLC

(57) ABSTRACT

An apparatus and method for providing an interactive service to devices using different digital broadcast middleware standards are provided. The apparatus includes an execution information providing module which provides execution information regarding an application that has been executed in a first device using a first middleware standard so that the application can be executed in a second device using a second middleware standard; and a request execution module which receives a request issued by the second device during the execution of the application in the second device, and performs an operation corresponding to the received request.

38 Claims, 4 Drawing Sheets

(51) Int. Cl.
  *H04L 12/28* (2006.01)
  *H04N 21/436* (2011.01)
  *H04N 21/40* (2011.01)
  *H04N 21/472* (2011.01)
  *H04N 21/418* (2011.01)
  *H04N 21/443* (2011.01)
  *H04N 21/4367* (2011.01)
  *H04N 21/478* (2011.01)
  *H04N 21/4363* (2011.01)

(52) U.S. Cl.
  CPC ....... *H04N 21/4183* (2013.01); *H04N 21/436* (2013.01); *H04N 21/4367* (2013.01); *H04N 21/43607* (2013.01); *H04N 21/43615* (2013.01); *H04N 21/43632* (2013.01); *H04N 21/443* (2013.01); *H04N 21/4431* (2013.01); *H04N 21/4433* (2013.01); *H04N 21/4437* (2013.01); *H04N 21/472* (2013.01); *H04N 21/478* (2013.01); *H04L 2012/2849* (2013.01)

(58) Field of Classification Search
  CPC ............. H04N 21/4367; H04N 21/443; H04N 21/4431; H04N 21/4433; H04N 21/4437; H04N 21/472; H04N 21/478
  See application file for complete search history.

(56) References Cited

U.S. PATENT DOCUMENTS

| | | | |
|---|---|---|---|
| 7,593,469 B2* | 9/2009 | Williams et al. | 375/257 |
| 2006/0130110 A1 | 6/2006 | Cho et al. | |
| 2007/0157263 A1* | 7/2007 | Horii et al. | 725/87 |
| 2008/0066101 A1* | 3/2008 | Song | 725/37 |
| 2008/0196075 A1* | 8/2008 | Candelore | 725/113 |

FOREIGN PATENT DOCUMENTS

| | | |
|---|---|---|
| KR | 10-2005-0065704 A | 6/2005 |
| KR | 1020060022538 A | 3/2006 |
| KR | 10-2006-0036325 A | 4/2006 |
| KR | 10-2006-0074271 A | 7/2006 |
| WO | 02/089483 A1 | 11/2002 |

OTHER PUBLICATIONS

Crinon et al. "Data Broadcasting and Interactive Television" Proceedings of the IEEE Jan. 2006, pp. 102-118, vol. 94, Iss. 1.

Communication dated Feb. 21, 2013 from the Korean Intellectual Property Office in counterpart Korean application No. 10-2007-0016157.

* cited by examiner

APPARATUS AND METHOD FOR PROVIDING INTERACTIVE SERVICE TO DEVICE USING DIFFERENT DIGITAL BROADCAST MIDDLEWARE STANDARDS

CROSS-REFERENCE TO RELATED PATENT APPLICATIONS

This application is a Continuation of U.S. application Ser. No. 11/855,538, filed on Sep. 14, 2007, which claims priority from Korean Patent Application No. 10-2007-0016157, filed on Feb. 15, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to providing an interactive service to devices using different digital broadcast middleware standards, and more particularly, to providing an interactive service to devices with different digital cable broadcast middleware standards without modification of existing specifications.

2. Description of the Related Art

Cable broadcasting is increasingly expected not only to be able to provide high-quality two-way services, but also to become a most suitable medium in the near future for broadcast/communication integrated services due to its capabilities to provide two-way services, achieve high transmission speeds and transmit considerable amounts of data.

In order to realize two-way digital cable broadcast services, set-top boxes (STBs), which are control boxes for receiving broadcast programs and performing various additional functions, are necessary.

STBs can provide bidirectionality to broadcasting, and are essential for the reception of digital broadcast programs with high picture quality and high sound quality and for the realization of two-way services. Thus, the importance of STBs to digital broadcasting has grown steadily.

Before the full implementation of digital broadcasting, a broadcast reception function used to be one of the main functions of STBs. However, with the digitalization of STBs, STBs have evolved into digital consumer devices that are capable of providing not only a broadcast reception function but also a variety of additional functions such as a communication function, a personal video recorder (PVR) function, and an electronic program guide (EPG) function.

OpenCable is a digital cable broadcast standard which includes both hardware and software specifications.

A hardware implementation of OpenCable includes an STB and a point of deployment (POD) module which separates conditional access/security functions from the STB, and a software implementation of OpenCable is OpenCable Applications Platform (OCAP), which is a middleware specification.

More specifically, OCAP is a standard for developing two-way applications. OCAP can provide web-based services for digital cable broadcasting and can thus support further advanced two-way services for viewers. OpenCable devices use the same middleware platform called OCAP and can thus share application software and content with one another.

High Definition Audio Video Network Alliance (HANA) has proposed a solution for connecting a built-in digital television (DTV) and one or more peripheral devices via IEEE 1394 so that the DTV and the peripheral devices can be controlled in an integrated manner, and that high-definition (HD) content can be shared between the DTV and the peripheral device. The HANA solution involves the use of a DTV equipped with a decoder and a web browser and a peripheral device equipped with a web server and a control page.

The HANA solution can enable a DTV to decode digital broadcast signals and HD content present in peripheral devices and can control the peripheral devices in an integrated manner using a web browser of the DTV as a graphic user interface (GUI).

The HANA solution can control all devices connected to an IEEE 1394 network using a single integrated remote control.

According to the HANA solution, EPG information, paper per view (PPV) data, video on demand (VOD) data, and shopping programs are transmitted between a HANA system including a HANA DTV, a television (TV) node, an audio/video (A/V) hard disc drive, and a HANA eXtended Home Theater (XHT) STB cable network interface unit (NIU), and an XHT STB as Hypertext Markup Language (HTML) data, and user interfaces (UIs) are displayed in the HANA system and the XHT STB as HTML data.

If an OpenCable STB connected to a HANA system via IEEE 1394 is equipped with OCAP middleware, applications that are executed using Multimedia Home Platform (MHP) or OCAP middleware may not be provided as HTML data, and thus may not be able to be directly applied to the HANA system. In order for an IEEE 1394-based HANA system to utilize OCAP-based interactive services, an extension to the OCAP specification is required.

Applications for providing UIs for a HANA system and providing UIs for users and various HANA applications may be executed using a web browser included in an HTML-based HANA DTV.

The OCAP 1.0 specification provides Java-based applications, called OCAP-J applications, and Java-based UIs. OCAP-J applications, however, cannot be executed using a web browser of a HANA DTV.

SUMMARY OF THE INVENTION

The present invention provides an apparatus and method for providing an interactive service to devices using different digital broadcast middleware standards which can enable devices that comply with the HANA specification to utilize OCAP applications.

According to an aspect of the present invention, there is provided an apparatus for providing an interactive service to devices using different digital broadcast middleware standards, the apparatus including an execution information providing module which provides execution information regarding an application that has been executed in a first device using a first middleware standard so that the application can be executed in a second device using a second middleware standard; and a request execution module which receives a request issued by the second device during the execution of the application in the second device, and performs an operation corresponding to the received request.

According to another aspect of the present invention, there is provided an apparatus for providing an interactive service to devices using different digital broadcast middleware standards, the apparatus including an application execution module which is provided with execution information regarding an application that has been executed in a first device using a first middleware standard and which executes the application in a second device using a second middleware standard with reference to the execution information, a request module which issues a request to the first device during the execution of the application in the second device, and a display module which displays the result of the execution of the application in the second device.

According to another aspect of the present invention, there is provide a method providing an interactive service to devices using different digital broadcast middleware standards, the method including providing execution information regarding an application that has been executed in a first device using a first middleware standard so that the application can be executed in a second device using a second middleware standard, and receiving a request issued by the second device during the execution of the application in the second device, and performing an operation corresponding to the received request.

According to another aspect of the present invention, there is provide a method of providing an interactive service to devices using different digital broadcast middleware standards, the method including receiving execution information regarding an application that has been executed in a first device using a first middleware standard and executing the application in a second device using a second middleware standard with reference to the execution information, issuing a request to the first device during the execution of the application in the second device, and displaying the result of the execution of the application in the second device.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
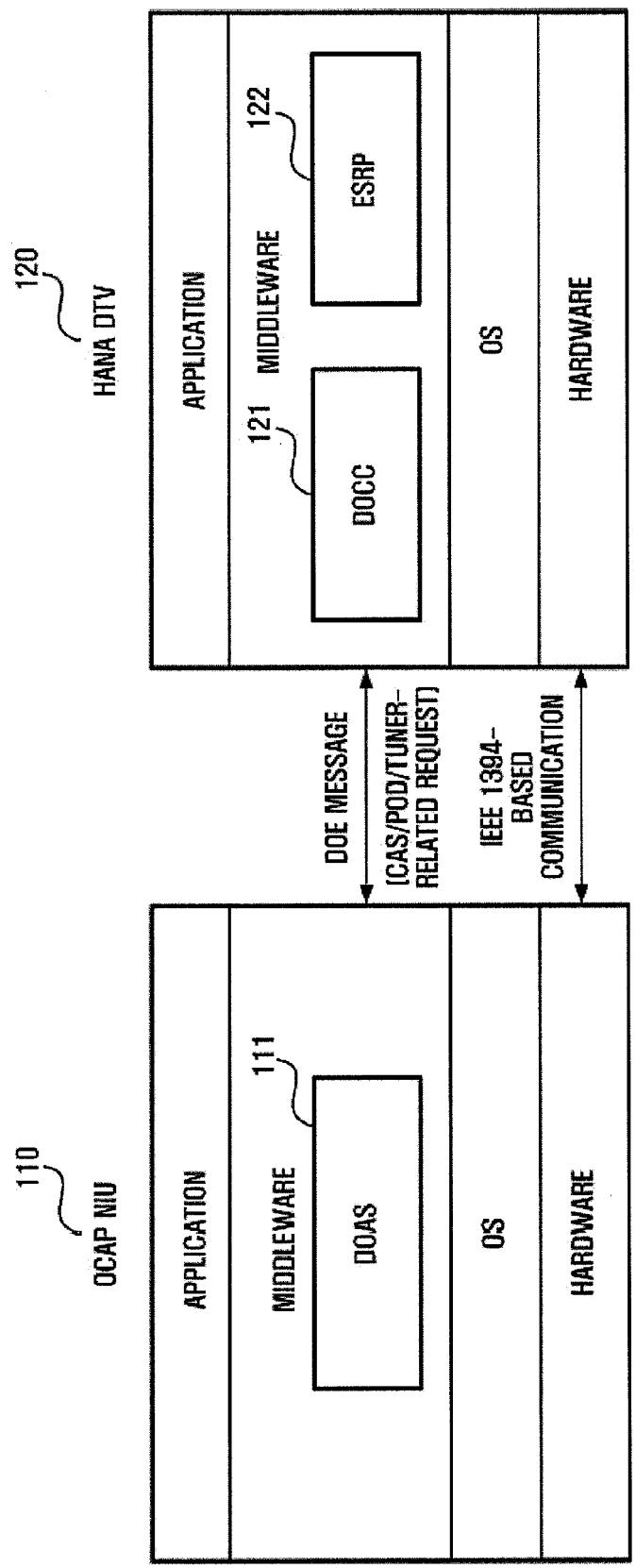
FIG. 1 is a block diagram of a system for providing an interactive service to devices using different digital broadcast middleware standards according to an exemplary embodiment of the present invention.

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Like reference numerals in the drawings denote like elements, and thus their description will be omitted.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a block diagram of a system for providing an interactive service to devices with digital broadcast middleware standards according to an exemplary embodiment of the present invention. Referring to FIG. 1, the system is designed for executing distributed OCAP applications so that OCAP applications can be executed in HANA DTVs without any modification to existing OCAP standard specifications.

Referring to FIG. 1, in order to execute an OCAP user interface or an OCAP application in a HANA DTV 120, an OCAP network interface unit (NIU) 110 may include a distributed OCAP application server (DOAS) 111, and the HANA DTV 120 may include a distributed OCAP client copy (DOCC) 121.

The HANA DTV 120 may also include an extended resource support package (ERSP) 122 for accessing graphic resources, MPEG-2 transport stream (TS) decoders, and A/V display resources. Therefore, an OCAP interactive service can be provided to the OCAP NIU 110 and the HANA DTV 120 which is connected to the OCAP NIU 110 via an HANA 1394 network.

In order to execute the DOAS 111 and the DOCC 121, a distributed OCAP environment library (DOEL) for a primitive running environment may be provided.

The DOAS 111, the DOCC 121, and the ERSP 122 will hereinafter be described in further detail with reference to FIGS. 2 and 3.

Figure 2:
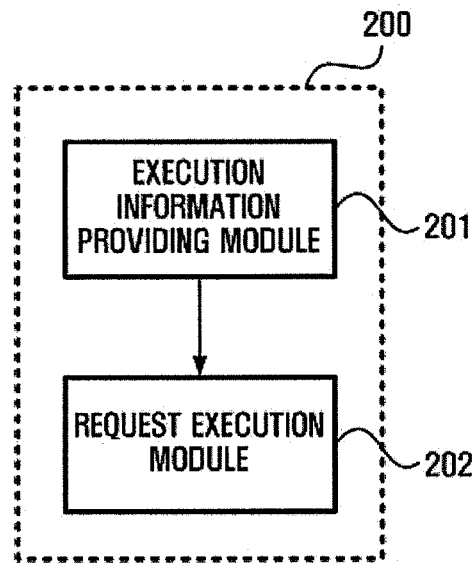
FIG. 2 is a block diagram of an apparatus for providing an interactive service to devices using different digital broadcast middleware standards according to an exemplary embodiment of the present invention.

FIG. 2 is a block diagram of an apparatus 200 for providing an interactive service to devices using different digital broadcast middleware standards according to an exemplary embodiment of the present invention. Referring to FIG. 2, assuming that there are first and second devices using different digital broadcast middleware standards, i.e., use first and second middleware standards, respectively, the apparatus 200 includes an execution information providing module 201 which provides execution information regarding an application that has been executed in the first device using the first middleware standard so that the application can also be executed in the second device using the second middleware standard; and a request execution module 202 which receives a request from the second device during the execution of the application in the second device and performs an operation corresponding to the received request.

Figure 3:
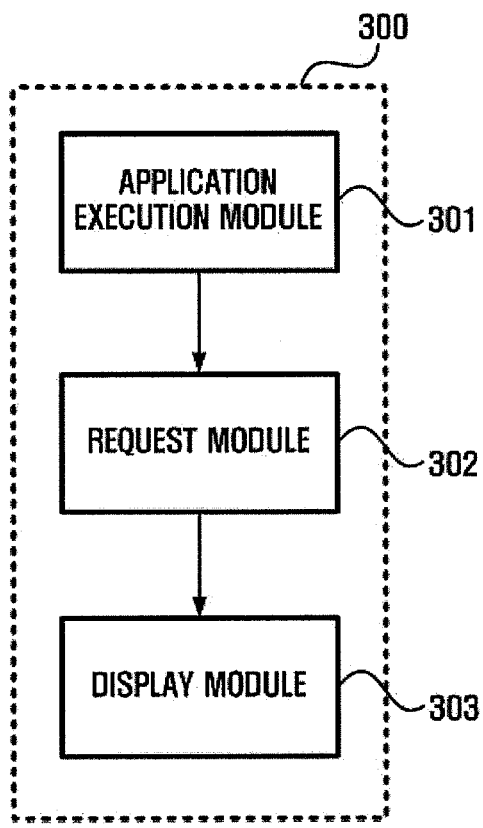
FIG. 3 is a block diagram of an apparatus for providing an interactive service to devices using different digital broadcast middleware standards according to another exemplary embodiment of the present invention.

FIG. 3 is a block diagram of an apparatus 300 for providing an interactive service to devices using different digital broadcast middleware standards according to another exemplary embodiment of the present invention. Referring to FIG. 3, the apparatus 300 includes an application execution module 301 which is provided with execution information regarding an application that has been executed in the first device by the first device and executes the application in the second device with reference to the execution information; a request module 302 which issues a request to the first device during the execution of the application in the second device; and a display module 303 which displays the result of executing the application in the second device in the second device.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

For purposes of explanation, it will be assumed that the apparatus 200 illustrated in FIG. 2 is included in the first device, and that the apparatus 300 illustrated in FIG. 3 is included in the second device.

Referring to FIG. 2, the execution information providing module 201 provides execution information regarding an application that has been executed in the first device using the first middleware standard so that the application can also be executed in the second device using the second middleware standard.

The first device may include OCAP middleware, and an application or a user interface (UI) that satisfies the OCAP standard may be executed in the first device.

The OCAP application executes at least one of a cable card, a Data Over Cable Service Interface Specification (DOCSIS) set-top gateway (DSG) module, a tuner, a demultiplexer, and an IEEE 1394 interface that are all installed in the first device. Here, the DSG transmits data using a cable modem. The execution information may include at least one of an OCAP unbound application, an OCAP Xlet, an application information table (AIT), an extended AIT (XAIT), system information (SI), and program system information protocol (PSIP) for executing, in the second device, an OCAP UI or an OCAP application that has been executed in the first device.

The execution information is needed for remote execution of the OCAP application in the second device. The first device may serve as a server by providing the second device with the execution information.

The OCAP application may be classified as a bound application or an unbound application. Information regarding the OCAP application may be provided as an AIT for a bound application or an XAIT for an unbound application by a head end. The execution information providing module 201 may be included in the first device. The execution information providing module 201 parses information present in the AIT or the XAIT provided by the head end, classifies the parsed information into application information regarding a tuner or a cable card to be executed in the first device and application information regarding a UI or a Java application, and provides the application information regarding a UI or a Java application to the second device.

The second device may execute an application with reference to the execution information provided by the execution information providing module 201. In this case, the second device may issue a request to the first device during the execution of an application in the second device, and the request execution module 202 in the first device may receive the request issued by the second device and execute a command corresponding to the received request.

The execution information providing module 201 and the request execution module 202 may be included in the DOAS 111 illustrated in FIG. 1.

The second device may include CEA-2027 middleware that involves XHT technology. The second device may include one or more HANA DTVs.

The request issued by the second device may be a request for channel-tuning for an application currently being executed by the second device or a request for an MPEG TS, SI data, PSI data, or information regarding at least one of a tuner, an out-of-band (OOB) channel, OOB receiver/transmitter, a persistent storage, section filters, conditional access system (CAS) messaging, a cable card, and object carousels to be executed in the first device.

The request execution module 202 receives the request issued by the second device, manages an AIT and conditions for the maintenance and termination of a bound application, exchanges an OCAP call for remote execution with the second device as a message, and enables the first device and the second device to operate in connection with each other.

Referring to FIG. 3, the application execution module 301 is provided with execution information regarding an application that has been executed in the first device and executes the application in the second device with reference to the execution information.

The first device may include OCAP middleware, and an application or a UI that satisfies the OCAP standard may be executed in the first device.

The second device may include CEA-2027A or CEA-931B middleware that involves XHT technology. The second device may include one or more HANA DTVs.

An OCAP application and execution information have already been described above with reference to FIG. 2, and thus, detailed descriptions thereof will be omitted.

The application execution module 301 may be provided with execution information regarding an application as a .jar file by the first device, and executes all OCAP applications in devices such as HANA DTVs.

In this case, the application execution module 301 may be provided with a copy of an OCAP application by the execution information providing module 201 of the apparatus 200 illustrated in FIG. 2. More specifically, the execution information providing module 201 parses information present in an AIT or an XAIT, classifies the parsed information into application information regarding a tuner or cable card to be executed in the first device and application information regarding a UI or a Java application, and provides the application information regarding a UI or a Java application to the second device.

Referring to FIG. 1, even if two or more HANA DTVs are connected to the OCAP NIU 110 via a network, the DOAS 111 can execute a plurality of DOCCs respectively copied to the HANA DTVs so that an OCAP application can be executed in each of the HANA DTVs.

In this manner, various applications selected by a user, for example, monitor applications, electronic program guide (EPG) data, OCAP bound applications and OCAP unbound applications, can be executed in devices such as HANA DTVs.

The request module 302 issues a request to the first device during the execution of an application in the second device. The request issued by the request module 302 has already been described above with reference to FIG. 2, and thus, a detailed description thereof will be skipped.

The application execution module 301 and the request module 302 may be included in the DOCC 121 illustrated in FIG. 1.

The display module 303 displays an OCAP UI or an OCAP application that has been executed in the second device.

For this, the display module 303 maps an org.dvb.* package, i.e., an ERSP, which is a set of classes that are implemented in connection with an OCAP UI and a media play by using native code or Java, to resources for executing the ERSP in a HANA DTV.

For example, in order to execute a JAVA UI application in a personal computer (PC), functions for drawing lines on a JAVA UI must be mapped to primitive code provided by a graphic and display application of a PC for drawing lines. Given all this, the display module 303 provides an ERSP for mapping primitive codes of a graphic and display system for controlling lines displayed on the screen of a HANA DTV or pixels on the screen of a HANA DTV to various functions in an application.

The display module 303 may include the ERSP 122 illustrated in FIG. 1.

The above-mentioned mapping process may be necessary for realizing functions such as 'play' and 'stop' in a Java Media Framework (JMF) which can process time-based media such as audio and video packages, and these functions may be provided by an ERSP.

Figure 4:
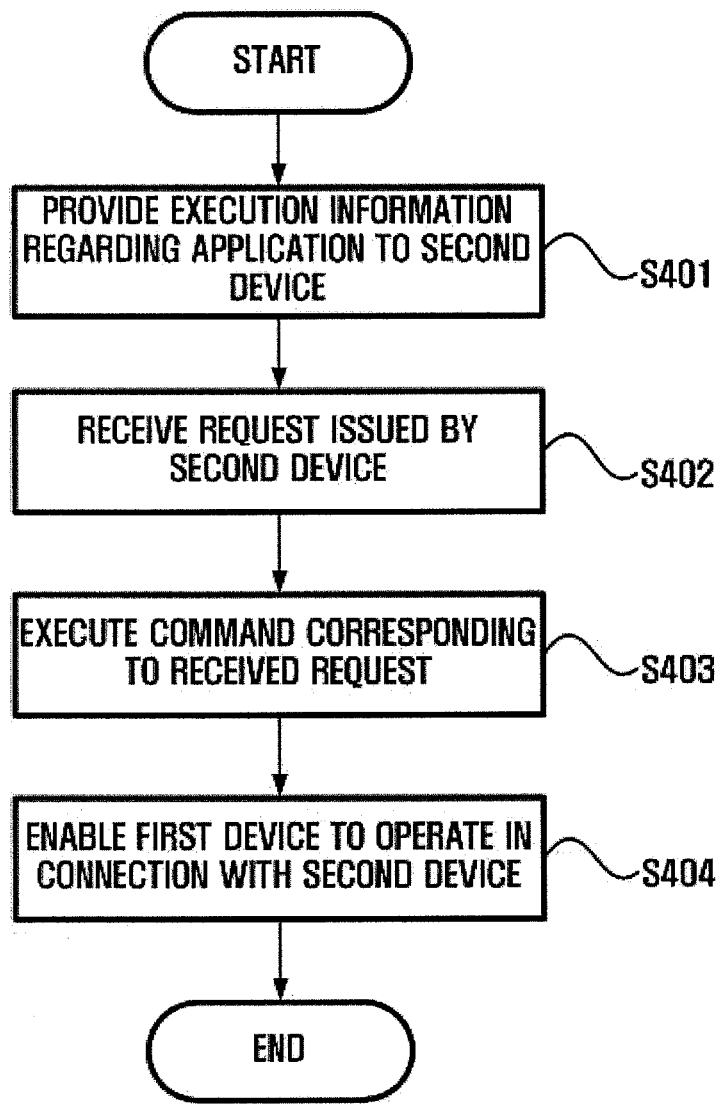
FIG. 4 is a flowchart illustrating a method of providing an interactive service to devices using different digital broadcast middleware standards according to an exemplary embodiment of the present invention.

FIG. 4 is a flowchart illustrating a method of providing an interactive service to devices using different digital broadcast middleware standards according to an exemplary embodiment of the present invention. For convenience, the method illustrated in FIG. 4 will hereinafter be described in detail with reference to FIGS. 2 and 3.

Referring to FIG. 4, in operation S401, the execution information providing module 201 of the apparatus 200 illustrated in FIG. 2 provides execution information regarding an application that has been executed in a first device using a first middleware standard so that the application can also be executed in a second device using a second middleware standard.

The first device may include OCAP middleware. An application or a UI that satisfies the OCAP standard may be executed in the first device.

The OCAP application executes at least one of a cable card, a DSG, a tuner, a demultiplexer, and an IEEE 1394 interface which are all installed in the first device. Here, the DSG transmits data using a cable modem. The execution information may include at least one of an OCAP unbound application, an OCAP Xlet, an AIT, an XAIT, SI, and PSIP for executing, in the second device, an OCAP UI or an OCAP application that has been executed in the first device.

The execution information is needed for remote execution of the OCAP application in the second device. The first device may serve as a server by providing the second device with the execution information.

In response to receiving the execution information, the second device executes the OCAP application with reference to the execution information, and issues a request to the first device during the execution of the OCAP application.

In operation S402, the request execution module 202 receives the request issued by the second device.

In operation S403, the request execution module 202 executes a command corresponding to the received request.

The second device may include CEA-2027A or CEA-931B middleware that involves XHT technology. The second device may include one or more HANA DTVs.

The received request may be a request for channel-tuning for the OCAP application currently being executed by the second device or a request for an MPEG TS, SI data, PSI data, or information regarding at least one of a tuner, an out-of-band (OOB) channel, an OOB receiver/transmitter, a persistent storage, section filters, conditional access system (CAS) messaging, a cable card, and object carousels to be executed in the first device.

In operation S404, the request execution module 202 manages an AIT and conditions for the maintenance and termination of a bound application in response to the received request, exchanges an OCAP call for remote execution with the second device as a message, and enables the first device and the second device to operate while connected with each other.

Figure 5:
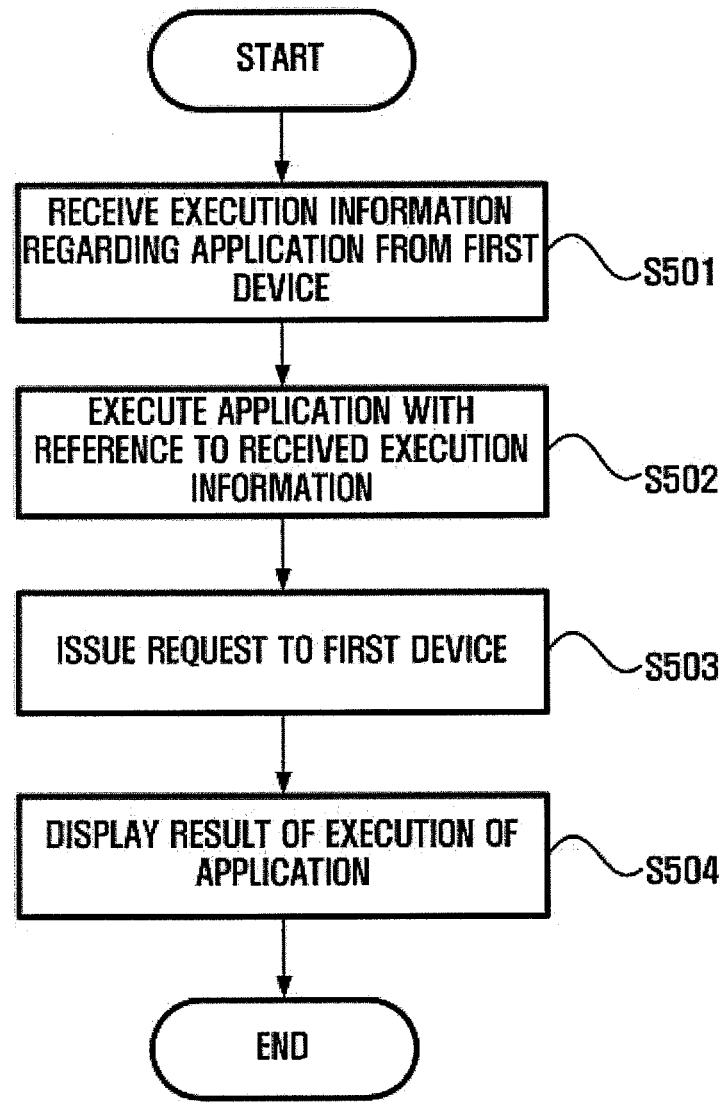
FIG. 5 is a flowchart illustrating a method of providing an interactive service to devices using different digital broadcast middleware standards according to another exemplary embodiment of the present invention.

FIG. 5 is a flowchart illustrating a method of providing an interactive service to devices using different digital broadcast middleware standards according to another exemplary embodiment of the present invention. Referring to FIG. 5, in operation S501, the application execution module 301 of the apparatus 300 illustrated in FIG. 3 receives execution information regarding an application that has been executed in the first device. In operation S502, the second device executes an application with reference to the execution information.

Here, the first device may include OCAP middleware, and an application or a UI that satisfies the OCAP standard may be executed in the first device.

The second device may include CEA-2027A or CEA-931B middleware that involves XHT technology. The second device may include one or more HANA DTVs.

An application and execution information have already been described above with reference to FIG. 2, and thus, detailed descriptions thereof will be skipped.

The application execution module 301 may be provided with execution information regarding an application as a .jar file by the first device, and executes all OCAP applications in devices such as HANA DTVs.

In this case, the application execution module 301 may be provided with a copy of an OCAP application by the execution information providing module 201 of the apparatus 200 illustrated in FIG. 2. More specifically, the execution information providing module 201 parses information present in an AIT or an XAIT, classifies the parsed information into application information regarding a tuner or cable card to be executed in the first device and application information regarding a UI or a Java application, and provides the application information regarding a UI or a Java application to the second device.

Referring to FIG. 1, even if two or more HANA DTVs are connected to the OCAP NIU 110 via a network, the DOAS 111 can execute a plurality of DOCCs respectively copied to the HANA DTVs so that an OCAP application can be executed in each of the HANA DTVs.

In this manner, various applications selected by a user, for example, monitor applications, electronic program guide (EPG) data, OCAP bound applications and OCAP unbound applications, can be executed in devices such as HANA DTVs.

In operation S503, the request module 302 issues a request to the first device during the execution of an application in the second device. The request issued by the request module 302 has already been described above with reference to FIG. 1, and thus, a detailed description thereof will be skipped.

In operation S504, the display module 303 displays an OCAP UI or an OCAP application that has been executed in the second device.

For this, the display module 303 maps an org.dvb.* package, i.e., an ERSP, which is a set of classes that are implemented in connection with an OCAP UI and a media play by using native code or Java, to resources for executing the ERSP in a HANA DTV.

The apparatus and method for providing an interactive service to devices using different digital broadcast middleware standards according to the present invention have the following advantages.

First, it is possible to promote the commercialization of the HANA XHT standard by enabling HANA devices (such as HANA DTVs) as well as OpenCable devices (such as OCAP cable NIUs) equipped with the OCAP 1.0 specification to receive OCAP-based broadcast services.

Second, it is possible to share A/V data between devices that are connected via a home network by interlinking OCAP-based interactive services provided by a head end with HANA solutions.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for providing an interactive service between a first device and a second device which utilize different digital broadcast middleware standards, the first device comprising:
   an execution information providing module which provides execution information regarding an application that has been executed in the first device using a first middleware standard of the first device, so that the application can be executed in the second device by using a second middleware standard of the second device; and
   a request execution module which receives, from the second device, a request to execute the application in the first device when executing the application in the second device based on the execution information, performs a command corresponding to the request which is received, and controls a result of the request to be displayed in the second device remotely.

2. The apparatus of claim 1, wherein the first device comprises OpenCable Application Platform middleware.

3. The apparatus of claim 1, wherein the application executes at least one of a cable card, a Data Over Cable Service Interface Specification set-top gateway module, and a tuner that are installed in the first device.

4. The apparatus of claim 1, wherein the execution information comprises at least one of a copy of the application, an application information table (AIT), an extended AIT, system information, and program system information protocol.

5. The apparatus of claim 4, wherein the execution information is utilized for remote execution of the application in the second device.

6. The apparatus of claim 1, wherein the second device comprises CEA-2027A or CEA-931B middleware that utilizes Extended Home Theater technology.

7. The apparatus of claim 6, wherein the second device comprises at least one High Definition Audio Video Network Alliance digital television.

8. The apparatus of claim 1, wherein the request comprises a request for channel tuning for the application or a request for at least one of an MPEG transport stream, system information data, and program system information data.

9. The apparatus of claim 1, wherein the application is remotely executed in the second device using the second middleware.

10. An apparatus for providing an interactive service between a first device and a second device which utilize different digital broadcast middleware standards, the second device comprising:
    an application execution module which receives execution information regarding an application that has been executed in the first device by using a first middleware standard of the first device, and which executes the application in the second device based on a second middleware standard of the second device with reference to the execution information;
    a request module which issues, to the first device, a request to execute the application in the first device when executing the application in the second device based on the execution information; and
    a display module which displays a result of the execution of the application by a remote control of the first device.

11. The apparatus of claim 10, wherein the first device comprises OpenCable Application Platform middleware.

12. The apparatus of claim 10, wherein the application executes at least one of a cable card, a Data Over Cable Service Interface Specification set-top gateway module, and a tuner that are installed in the first device.

13. The apparatus of claim 10, wherein the execution information comprises at least one of a copy of the application, an application information table (AIT), an extended AIT, system information, and program system information protocol.

14. The apparatus of claim 13, wherein the execution information is utilized for remote execution of the application in the second device.

15. The apparatus of claim 10, wherein the second device comprises CEA-2027A or CEA-931B middleware that utilizes Extended Home Theater technology.

16. The apparatus of claim 14, wherein the second device comprises at least one High Definition Audio Video Network Alliance digital television.

17. The apparatus of claim 10, wherein the application execution module manages at least one of download of the application, the execution of the application in the second device, and termination of the execution of the application in the second device.

18. The apparatus of claim 10, wherein the request comprises a request for channel tuning for the application or a request for at least one of an MPEG transport stream, system information data, and program system information protocol data.

19. The apparatus of claim 10, wherein the application is remotely executed in the second device using the second middleware.

20. A method providing an interactive service between a first device and a second device which utilize different digital broadcast middleware standards, the method comprising:
providing execution information regarding an application that has been executed in the first device using a first middleware standard of the first device so that the application can be executed in the second device by using a second middleware standard of the second device; and
receiving, from the second device, a request to execute the application in the first device when executing the application in the second device based on the execution information,
performing a command corresponding to the request which is received; and
controlling a result of the result to be displayed in the second device remotely.

21. The method of claim 20, wherein the first device comprises OpenCable Application Platform middleware.

22. The method of claim 20, wherein the application executes at least one of a cable card, a Data Over Cable Service Interface Specification set-top gateway module, and a tuner that are installed in the first device.

23. The method of claim 20, wherein the execution information comprises at least one of a copy of the application, an application information table (AIT), an extended AIT, system information, and program system information protocol.

24. The method of claim 23, wherein the execution information is utilized for remote execution of the application in the second device.

25. The method of claim 20, wherein the second device comprises CEA-2027A or CEA-931B middleware that utilizes XHT technology.

26. The method of claim 25, wherein the second device comprises at least one High Definition Audio Video Network Alliance digital television.

27. The method of claim 20, wherein the request comprises a request for channel tuning for the application or a request for at least one of an MPEG transport stream, system information data, and program system information data.

28. The method of claim 20, wherein the application is remotely executed in the second device using the second middleware.

29. A method of providing an interactive service between a first device and a second device which utilize different digital broadcast middleware standards, the method comprising:
receiving execution information regarding an application that has been executed in the first device based on a first middleware standard of the first device, and executing the application in the second device based on a second middleware standard of the second device with reference to the execution information;
issuing, to the first device, a request to execute the application in the first device when executing the application in the second device based on the execution information; and
displaying the application in the second device displaying a result of the executing of the application by a remote control of the first device.

30. The method of claim 29, wherein the first device comprises OpenCable Application Platform middleware.

31. The method of claim 29, wherein the application executes at least one of a cable card, a Data Over Cable Service Interface Specification set-top gateway module, and a tuner that are installed in the first device.

32. The method of claim 29, wherein the execution information comprises at least one of a copy of the application, an application information table (AIT), an extended AIT, system information, and program system information protocol.

33. The method of claim 32, wherein the execution information is utilized for remote execution of the application in the second device.

34. The method of claim 29, wherein the second device comprises CEA-2027A or CEA-931B middleware that utilizes XHT technology.

35. The method of claim 34, wherein the second device comprises at least one High Definition Audio Video Network Alliance digital television.

36. The method of claim 29, wherein the executing the application, comprises managing at least one of download of the application, the execution of the application in the second device, and termination of the execution of the application in the second device.

37. The method of claim 29, wherein the request comprises a request for channel tuning for the application or a request for at least one of an MPEG transport stream, system information data, and program system information data.

38. The method of claim 29, wherein the application is remotely executed in the second device using the second middleware.

* * * * *